United States Patent [19]

Novak

[11] Patent Number: 4,474,927

[45] Date of Patent: Oct. 2, 1984

[54] POLYAMIDE COMPOSITIONS TOUGHENED WITH CROSSLINKED ACRYLIC RUBBER

[75] Inventor: Ernest R. Novak, Vienna, W. Va.

[73] Assignee: E. I. Du Pont de Nemours and Company, Wilmington, Del.

[21] Appl. No.: 331,228

[22] Filed: Dec. 16, 1981

[51] Int. Cl.³ .................. C08L 51/06; C08L 77/00; C08L 77/02; C08L 77/06
[52] U.S. Cl. .................................. 525/66; 525/183; 525/301
[58] Field of Search ................ 525/66, 301, 183

[56] References Cited

U.S. PATENT DOCUMENTS

| | | | |
|---|---|---|---|
| 4,167,505 | 9/1979 | Dunkelberger | 525/183 |
| 4,221,879 | 9/1980 | Humme et al. | 525/66 |
| 4,306,040 | 12/1981 | Baer | 525/310 |
| 4,310,638 | 1/1982 | Coran et al. | 525/183 |
| 4,315,085 | 2/1982 | Ozari et al. | 525/301 |
| 4,331,784 | 5/1982 | Ishibashi et al. | 525/301 |
| 4,385,152 | 5/1983 | Boyack et al. | 525/301 |

FOREIGN PATENT DOCUMENTS 40-944 1/1965 Japan .................................. 525/183

*Primary Examiner*—Allan M. Lieberman

[57] ABSTRACT

Polyamide toughening crosslinked acrylic rubbers having an outer layer of an alkyl acrylate and a polyamide graft-linking monomer, this outer layer having a glass transition temperature of less than about 20° C.

6 Claims, 1 Drawing Figure

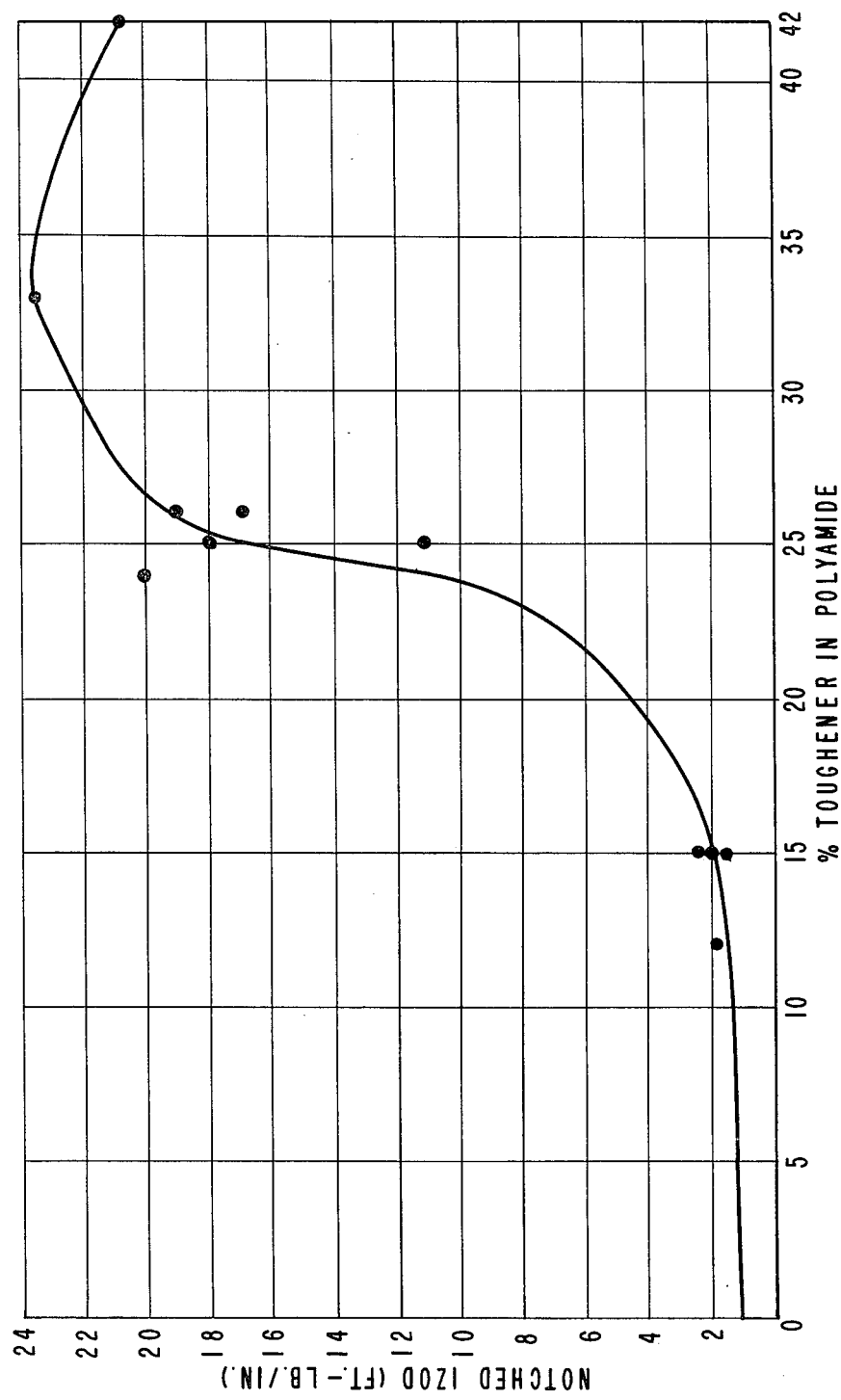

POLYAMIDE COMPOSITIONS TOUGHENED WITH CROSSLINKED ACRYLIC RUBBER

BACKGROUND OF THE INVENTION

The subject invention relates to emulsion polymerized crosslinked acrylic rubbers and their use as tougheners for polyamide resins.

Additives useful as polyamide tougheners are well known in the art. U.S. Pat. No. 4,174,358 issued on the application of Epstein discloses adding, to the polyamide, 1 to 40 weight percent of at least one polymer having a particle size of 0.01 to 3.0 microns, and a tensile modulus of 1.0 to 20,000 psi, said polymer being either a branched or straight chained polymer, i.e., noncrosslinked.

Further, a number of U.S. Patents assigned to Rohm & Haas, e.g., U.S. Pat. Nos. 3,668,274; 3,793,402; 3,796,771; 3,985,703; 4,086,300; and 4,148,846, as well as J5 4048-850 and J5 4048-851 assigned to Toray Industries, Inc. all disclose the use of acrylic rubber tougheners for polyamide resins wherein the outer layer of the toughener is necessarily rigid, i.e., has a glass transition temperature of greater than 20° C.

SUMMARY OF THE INVENTION

The subject invention is an emulsion polymerized crosslinked acrylic rubber useful for toughening a polyamide matrix wherein the outermost layer of the toughener is non-rigid, i.e., has a glass transition temperature of less than about 20° C. When blended with a polyamide resin, the toughness of the polyamide increases up to about eight fold over such resin filled with rigid outer layered acrylic rubber tougheners of the prior art.

More specifically, the subject invention is an emulsion polymerized crosslinked acrylic rubber comprising 0 to 99.0 weight percent of an inner phase of a crosslinked alkyl acrylate having 1 to 15 carbon atoms and at least 1.0 weight percent of an outer phase having a glass transition temperature of less than about 20° C., said outer phase comprising an alkyl acrylate having 1 to 15 carbon atoms, optionally crosslinked, and 0.1 to 10 weight percent of a polyamide graft-linking monomer. The subject invention also includes polyamide resin toughened with this acrylic rubber.

BRIEF DESCRIPTION OF THE FIGURE

The FIGURE is a graphical representation of the effect of the acrylic rubber of the subject invention on the toughness of a polyamide matrix.

DETAILED DESCRIPTION

The critical aspect of the acrylic rubber of the subject invention is the existence of an outer layer having a glass transition temperature of less than about 20° C., this outer layer comprising an optionally crosslinked alkyl acrylate wherein the alkyl group contains 1 to 15 carbon atoms, and 0.1 to 15 weight percent of a polyamide graft linking monomer. As detailed in U.S. Pat. No. 4,086,300, incorporated herein by reference, such acrylic monomers include aralkyl esters of acrylic acid wherein the cyclic portion contains 5, 6 or 7 carbon atoms with or without an additional alkyl bridge, the alkyl portion of the aralkyl group containing up to 15 carbon atoms; substituted acrylates or methacrylates including alkylthioalkyl acrylates such as ethyl thioethyl acrylate; alkoxyalkyl acrylates such as methoxyethyl acrylate; hydroxy alkyl, haloalkyl, cyanoalkyl, nitroalkyl; acrylates and methacrylates; acrylamide, methacrylamide and alkyl acrylamides and methacrylamides.

Preferred polyamide graft linking monomers of the subject invention, responsible for binding the acrylic rubber outer phase to the polyamide during the blending of the two as described below, also as detailed in '300, are those carboxylic acids such as acrylic, methacrylic, itaconic, fumaric, maleic, citraconic, α-methylene glutaric, aconitic, methylene malonic, mesaconic acids and substituted acrylic acids such as α-hydroxymethyl- or α-halomethyl acrylic acids as well as acids such as methacryloxypropionic acid, acryloxy- or methacryloxyisopropyl acid phthalate, acryloxy- or methacryloxy-ethyl or isopropyl acid oxalate, maleate, succinate and glutrate.

Of course, the alkyl acrylate may be copolymerized with an ethylenically unsaturated comonomer present in an amount less than about 50 weight percent based on the alkyl acrylate, examples of such comonomers being ethylene, styrene, methylstyrene, vinyl and vinylidene halides, vinyl ethers, amides and esters, so long as this outer phase retains a glass transition temperature of less than 20° C.

If crosslinking of this outer phase is desired, this can be achieved by inclusion in the polymerization described below up to 5.0 weight percent of a polyethylenically unsaturated crosslinking monomer such as polyacrylic and polymethacrylic esters of polyols such as butylene diacrylate and dimethacrylate, trimethylolpropane trimethacrylate, di- and trivinyl benzene, vinyl acrylate and methacrylate and other crosslinking monomers.

In one embodiment of the subject invention, the entire acrylic rubber particle is made up of the composition as described above, in which case the above detailed crosslinking is necessary. However, as long as the outer-most layer of the particle is comprised of that composition, an inner phase of 10 to 99.0 weight percent of the particle can be made up of simply a crosslinked alkyl acrylate having 1 to 15 carbon atoms, the crosslinking carried out by including in the polymerization described below a crosslinking monomer as described above. In this embodiment, the outer phase, present in an amount equal to 1.0 to 90.0 weight percent of the composition, need not be crosslinked.

Within the inner phase there additionally may be up to 5.0 weight percent of a graftlinking monomer to assist in the linking of the inner phase to the outer phase. As detailed in '300, those compounds generally useful in this regard include allyl methacrylate, allyl acrylate, allyl, methallyl, and crotyl esters of acrylic acid, methacrylic acid, maleic acid (mono- and di- esters); fumaric acid (mono- and di- esters) and itaconic acid (mono- and di-esters); allyl, methallyl and crotyl vinyl ether; allyl, methallyl, and crotyl vinyl thioether; N-allyl, ethallyl or crotyl maleimide; vinyl esters of 3-butenoic and 4-pentenoic acids; triallyl cyanurate; o-allyl, methallyl or crotyl, O-allkyl, aryl alkaryl or aralkyl P-vinyl, allyl, or methallyl phosphonate, triallyl, trimethallyl or tricrotyl phosphate; O-vinyl, O,O-diallyl, dimethallyl or dicrotyl phosphate, cycloalkenyl esters of acrylic acid, methacrylic acid, maleic acid (mono- or diesters), fumaric acid (mono- or di- esters), itaconic acid (mono- or diesters), such as 2; 3; or 4-cyclohexenyl acrylate, bicyclo (2,2,1) hept-5-ene-2-yl esters of acrylic acid, methacrylic acid, maleic acid (mono- or di- esters), fumaric acid (mono- and di-esters) and itaconic acid (mono- or diesters); vinyl ethers and vinyl thioethers of cycloalkenols and cycloalkene thiols such as vinyl cyclohex-4-ene-1-yl ether, vinyl ether of bicyclo (2,2,1) hept-5-ene-2-ol, vinyl esters of cycloalkene carboxylic acids such as vinyl cyclohex-3-ene-1-carboxylic acid or vinyl bicyclo (2,2,1) hept-5-ene-2-carboxylate, and the diallyl esters of polycarboxylic acids which do not contain polymerizable unsaturation.

Further, the inner phase may also contain any of the copolymerizable ethylenically unsaturated comonomers described above as being candidates for inclusion in the outer phase.

The acrylic rubbers of the subject invention are prepared by emulsion polymerization well known in the art. The monomers to be polymerized are mixed with initiators, soaps/emulsifiers, and/or chain transfer agents.

In accordance with '300, the polymerization reactions can be initiated by either thermal or redox-type initiator systems. Examples of thermal initiators include the organo peroxides, such as benzoyl peroxide, substituted benzoyl peroxides, acetyl peroxide, lauryl peroxide, t-butyl hydroperoxide, di-t-butyl peroxide, peresters, such as t-butyl peroxypivalate; azo-type initiators, such as azo-bis-isobutyronitrile; persulfates, such as sodium, potassium, or ammonium persulfate; and peroxyphosphates, such as sodium, potassium, or ammonium peroxyphospate. Redox initiators include, for example, a combination of a hydroperoxide, such as hydrogen peroxide, t-butyl hydroperoxide, cumene hydroperoxide, diisopropyl benzene hydroperoxide, and a reducing agent, such as sodium, potassium or ammonium bisulfite, metabisulfite, or hydrosulfite, sulfur dioxide, hydrazine, ferrous salts, isoascorbic acid and sodium formaldehyde sulfoxalate.

Examples of emulsifiers or soaps suited to the polymerization processes of the present invention include alkali metal and ammonium salts of alkyl, aryl, alkaryl, and aralkyl sulfonates, sulfates, and polyether sulfates, fatty acids, ethoxylated fatty acids, esters, alcohols, amines, amides, alkyl phenols, complex organo-phosphoric acids and their alkali metal and ammonium salts.

Chain transfer agents, including mercaptans, polymercaptans, and polyhalogen compounds are often desirable in the polymerization mix.

The polyamide matrix resin to be toughened using compositions of this invention is well known in the art and embraces those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), poly-bis(paraaminocyclohexylmethane) dodecanoamide, the polyamides produced by ring opening of lactams, i.e., polycaprolactam (6 nylon), polylauric lactam, polyundecanolactam (11 nylon). It is also possible to use in this invention polyamides prepared by the copolymerization of two of the above polymers or terpolymerization of the above polymers or their components, e.g., for example, an adipic, isophthalic acid hexamethylene diamine copolymer. Preferably the polyamides are linear with a melting point in excess of 200° C.

The acrylic rubber toughener of the subject invention and the polyamide can be blended in any conventional manner, as described in '300. For example, the composition can be melt blended into a uniform mixture in a multi-screw extruder such as a Werner Pfleider extruder, as seen in the Example below, or in a conventional plasticating device such as a Brabender, Banbury mill or the like. Alternatively, the components can be dry mixed together and melt fabricated by extrusion.

The acrylic rubber of the subject invention, as well as the polyamide toughened therewith, will be more fully appreciated by reference to the Example that follows.

EXAMPLE

Referring to the Table, the abbreviations for polymerization components used therein are as follows: BA - butyl acrylate; IA - itaconic acid; AMA - allyl methacrylate; and EDMA - ethylene dimethacrylate. All percentages used herein, unless otherwise specified, are weight percentages. The polyamide used for test purposes was "Zytel" 101, a nylon 66 sold by E. I. du Pont de Nemours and Company, with a Notched Izod value of 1.1 ft-lb/in.

About 3–5% of the inner phase monomers were emulsified in a polymerization reactor at 80°–86° C. using 0.6 weight percent sodium dioctyl sulfosuccinate surfactant, and 0.3 weight percent potassium or ammonium persulfate initiator was added to polymerize a seed. The remainder of the inner phase monomers containing 0.6 weight percent of surfactant were then fed to the reactor over a period of 90 minutes. After an additional 20 minutes, the polymerization of the inner phase was completed. Feeding of outer phase monomer was then carried out over a period of about 40 minutes. Additional initiator totalling 0.03 weight percent based on total monomer was added incrementally throughout the polymerization reaction. Further, the itaconic acid, dissolved in hot water, was added in two or three increments during the feeding of the outer phase monomers. In each case, the outer phase of the acrylic rubber had a glass transition temperature of less than 20° C.

The acrylic rubber of the subject invention, as an aqueous dispersion, and the polyamide were blended in a 28 mm Werner & Pfleider twin-screw extruder wherein the melt temperature was 302° C. and the extruder screw speed was 249 RPM, such blending being well known in the art as described in '300. Accordingly, after melting the polyamide in the extruder, the aqueous acrylic rubber dispersion was injected into the melt. The extruder barrel was less than 100% full so that the pressure therein was less than one atmosphere, allowing excess water to be vented out of the mixture. The melt was then forced out of the extruder through a die. The extruded strands were quenched in water, cut into pellets and dried overnight in a vacuum oven. Finally, the dried pellets were injection molded into test bars using a 6 ounce Van Dorn reciprocating screw molding machine using a fast ram speed, barrel temperature of 270–280° C. and a mold temperature of 90° C.

After blending the acrylic rubber of the subject invention with the polyamide, a Notched Izod impact test (ASTM D256, 23° C.) was run on the samples, reported in ft-lb/in in the accompanying table and graphically illustrated in the FIGURE as a function of percent acrylic rubber.

TABLE

| TEST | INNER PHASE | OUTER PHASE | % INNER/ % OUTER | % RUBBER IN POLYAMIDE | Notched Izod (Ft-lb/in) |
|---|---|---|---|---|---|
| 1 | Cross-linked 99.25% BA 0.25% AMA 0.50% EDMA | 94% BA 6% IA | 84/16 | 12.0 | 1.7 |
| 2 | Cross-linked 99.25% BA 0.25% AMA 0.50% EDMA | 94% BA 6% IA | 84/16 | 15.0 | 2.15 |
| 3 | Cross-linked 99.25% BA 0.25% AMA 0.50% EDMA | 94% BA 6% IA | 84/16 | 20.0 | 4.6 |
| 4 | Cross-linked 99.25% BA 0.25% AMA 0.50% EDMA | 94% BA 6% IA | 84/16 | 25.0 | 21.5 |
| 5 | Cross-linked 99.25% BA 0.25% AMA 0.50% EDMA | 94% BA 6% IA | 84/16 | 27.0 | 19.0 |
| 6 | Cross-linked 99.25% BA 0.25% AMA 0.50% EDMA | 94% BA 6% IA | 84/16 | 33.0 | 23.5 |
| 7 | Cross-linked 99.25% BA 0.25% AMA 0.50% EDMA | 94% BA 6% IA | 84/16 | 42.0 | 20.8 |
| 8 | Cross-linked 99.25% BA 0.25% AMA 0.50% EDMA | 94% BA 6% IA | 84/16 | 15.0 | 2.15 |
| 9 | Cross-linked 99.25% BA 0.25% AMA 0.50% EDMA | 94% BA 6% IA | 84/16 | 25.0 | 11.2 |
| 10 | Cross-linked 99.25% BA | 96.87% BA 3.13% IA | 84/16 | 15.0 | 1.65 |

TABLE-continued

| TEST | INNER PHASE | OUTER PHASE | % INNER/ % OUTER | % RUBBER IN POLYAMIDE | Notched Izod (Ft-lb/in) |
|---|---|---|---|---|---|
| 11 | Cross-linked 99.25% BA 0.25% AMA 0.50% EDMA | 96.87% BA 3.13% IA 0.25% AMA 0.50% EDMA | 84/16 | 26.0 | 16.8 |
| 12 | Cross-linked 99.25% BA 0.25% AMA 0.50% EDMA | 93.05% BA 6.25% IA 0.23% AMA 0.47% EDMA | 84/16 | 15.0 | 1.9 |
| 13 | Cross-linked 99.25% BA 0.25% AMA 0.50% EDMA | 93.05% BA 6.25% IA 0.23% AMA 0.47% EDMA | 84/16 | 25.0 | 17.9 |

I claim:

1. A toughened polyamide composition comprising:
   (a) 60 to 99 weight percent polyamide; and
   (b) 1 to 40 weight percent of an emulsion polymerized crosslinked acrylic rubber comprising:
      (1) 0 to 99.0 percent of an inner phase of a crosslinked alkyl acrylate having 1 to 15 carbon atoms; and
      (2) at least 1.0 weight percent of an outer phase of a crosslinked alkyl acrylate wherein the alkyl group contains 1 to 15 carbon atoms and 0.1 to 15 weight percent of a polyamide graft-linking carboxylic acid monomer, said outer phase having a glass transition temperature less than about 20° C.

2. A toughened polyamide composition comprising:
   (a) 60 to 99 weight percent polyamide; and
   (b) 1 to 40 weight percent of an emulsion polymerized crosslinked acrylic rubber comprising:
      (1) 10 to 99.0 percent of an inner phase of a crosslinked alkyl acrylate having 1 to 15 carbon atoms; and
      (2) 1.0 to 90.0 weight percent of an outer phase of an alkyl acrylate wherein the alkyl group contains 1 to 15 carbon atoms and 0.1 to 15 weight percent of a polyamide graft-linking carboxylic acid monomer said outer phase having a glass transition temperature of less than about 20° C.

3. The composition of claims 1 or 2 wherein the weight percent of polyamide is 70 to 85 and the weight percent of (b) is 15 to 30.

4. The composition of claim 1 or 2 wherein the inner phase alkyl acrylate is copolymerized with an ethylenically unsaturated comonomer present in an amount less than 50 percent by weight based on the alkyl acrylate.

5. The composition of claim 1 or 2 wherein the outer phase alkyl acrylate is copolymerized with an ethylenically unsaturated comonomer present in an amount less than 50 percent by weight based on the alkyl acrylate.

6. The composition of claim 1 or 2 wherein the inner phase contains up to 5.0 weight percent of a polyethylenically unsaturated graft-linking monomer.

* * * * *